United States Patent [19]

Zepter et al.

[11] Patent Number: 4,627,948
[45] Date of Patent: Dec. 9, 1986

[54] METHOD OF MANUFACTURING A SINTERED DOLOMITE IN A SHAFT KILN

[75] Inventors: Karl H. Zepter, Mettmann; Dieter Opitz, Breitscheid; Alfred Roeder, Duisburg; Max Chmiel, Hagen, all of Fed. Rep. of Germany

[73] Assignee: Dolomitwerke GmbH, Wulfrath, Fed. Rep. of Germany

[21] Appl. No.: 473,683

[22] Filed: Mar. 8, 1983

[30] Foreign Application Priority Data

Mar. 18, 1982 [DE] Fed. Rep. of Germany ....... 3209836

[51] Int. Cl.$^4$ .............................................. C04B 33/32
[52] U.S. Cl. ...................................... 264/56; 264/346; 501/113
[58] Field of Search ................... 264/56, 346; 501/113

[56] References Cited

U.S. PATENT DOCUMENTS

| 3,384,569 | 5/1968 | Peet | 208/11 R |
| 3,475,319 | 10/1969 | MacLaren | 208/11 R |
| 3,562,143 | 2/1971 | Jagel, Jr. et al. | 202/221 |

OTHER PUBLICATIONS

Ceramic Industry Magazine, Jan. 1975, pp. 59–60.
Industrial Minerals and Rocks, Raymond Birch, Amer. Inst. of Mining and Metallurgical Engineers, 1937, pp. 433–448.
Industrial Ceramics, Felix Singer and Sonja Singer, Chapman Hill Ltd, 1963, pp. 1257–1260.

Primary Examiner—Donald Czaja
Assistant Examiner—Mary Lynn Fertig
Attorney, Agent, or Firm—Collard, Roe & Galgano

[57] ABSTRACT

In a method of manufacturing sintered dolomite having raw densities exceeding about 3.0 grams per cubic centimeter in a shaft kiln from ground raw dolomite briquetted or pelletized into shaped bodies, the steps include deacidifying and heating the shaped bodies to a temperature of at least 1000° C. in an upper region of the shaft kiln in a preheating and deacidifying zone heated with fuels of a low thermal content, thereafter sintering the shaped bodies in a lower sintering zone heated with fuels of high thermal content, so as to heat the shaped bodies to a temperature of about 1600° C. to about 2000° C., and subsequently passing the sintered bodies into a lower cooling zone, cooling the bodies therein, and, thereafter, discharging the sintered bodies from the shaft kiln.

6 Claims, 1 Drawing Figure

METHOD OF MANUFACTURING A SINTERED DOLOMITE IN A SHAFT KILN

FIELD OF THE INVENTION

The invention relates to a method for manufacturing of sintered dolomite having raw densities exceeding 3 g/cm$^3$ in a shaft kiln from briquetted or pelletized ground raw dolomite shaped into bodies. Furthermore, the invention relates to carrying out the method in a suitable shaft kiln.

BACKGROUND OF THE INVENTION

Sintered dolomite is required for the manufacture of fire resistant shaped bodies. It is qualitatively the more valuable, the denser it is sintered, and the fewer contaminations it contains. If possible, sintered dolomite is sintered from lumpy raw dolomite in a so-called penetration-by-burning process in a shaft kiln or in a rotary kiln, wherein solid fuels, cinder or anthracite are admixed to the lumpy raw dolomite; the sintering in the rotary kiln, however, is accomplished mostly with a coal dust or oil firing, less frequently with natural gas. The rotary-kiln sintered dolomite is more uniform with respect to the shaft kiln sinter, as far as its quality is concerned. The shaft kiln sinter requires, at more than 97% carbonate content of the raw dolomite by weight, a heat expenditure of more than 8000 kJ/kg sinter; modern rotary kilns, however, require a heat amount of more than 7000 kJ/kg sinter for the manufacture of sintered dolomite, but admittedly need a high-grade, and therefore expensive fuel.

Furthermore, in exceptional cases, particularly when the raw dolomite is very non-uniform in its composition, or if it is hard to sinter, or if too low MgO contents are present, the sintered dolomite is manufactured in a so-called double penetration-by-burning process. In the first sintering, the raw dolomite is sintered merely caustically, then ground, possibly mixed with additional materials, formed to pellets or pressed into briquettes, which are then sintered in a shaft kiln or rotary kiln. The heat expenditure for this process differs according to the sintering aggregates used, but is very high, so that it is used only in exceptional cases.

SUMMARY OF THE INVENTION

It is an object of the present invention to devise a process for the manufacture of high-grade sintered dolomite with raw densities exceeding 3.0 g/cm$^3$, which starts from briquetted or pelletized ground raw dolomite, and which can be carried out in a shaft kiln with as low a heat expenditure as possible and utilizing, at least partly, inexpensive low-grade fuels, so that the advantages of a two-step sintering process are maintained; this makes it possible to homogenize the sinter, and to improve it by additional materials.

It has been found that this object can be attained if the raw dolomite, briquetted or pelletized into shaped bodies, is deacidified in an upper region of the shaft kiln in a preheating or deacidifying zone, heated with fuels of low calorific values to at least 1000° C., is thereafter sintered in a lower sintering zone with fuels of high thermal values, so as to be heated to temperatures from about 1600° C. to 2000° C., and if thereafter the sintered goods are cooled in a cooling zone disposed therebelow.

Advantageously, in this method at least 60% (about ⅔) of the heated cooling air is used as primary air for burning of the fuels of low thermal values for heating the deacidifying zone, while at most 40% (about ⅓) of the heated cooling air is used as primary air for burning of the fuels of high thermal value for heating the sintering zone.

The term "fuel of low thermal value" is inventively understood to include ash-rich pit coal, water-containing brown coal, lognite blast furnace gas, waste oil or coal slack cinder having particle sizes less than 3 mm; the term "fuels of high thermal values" is understood, according to the invention, to apply to ash-poor coal having less than 10% of ashes, less than 1% of water, and less than 10% of volatile components, heavy heating coal having less than 2% of sulphur, light heating coal having less than 1% sulphur, natural gas and refinery gas.

The fuels with a high thermal value content (high grade fuels) differ from fuels with lesser (lower) thermal values (low-grade or inferior fuels) by having a larger uniformity and a smaller content of contaminations. They are therefore regularly high in price. Inferior fuels are, however, suitable for heating the deacidifying zone, because in this region of the oven only sintering temperatures of at least 1000° C. are desired. Any small irregularities when supplying heat to the calcining zone can be neglected. In contrast thereto in the sintering zone a high sintering temperature above 1600° C., preferably 2000° C., must be generated, with as uniform an extension over the entire oven cross-section, and with as even a temperature profile as possible. For this high temperature region of the sintering zone, high grade fuels are therefore required, by means of which it is also more easily possible to set up a defined fuel-to-air ratio.

According to an advantageous implementation form of the invention, oxygen is added to the primary air, which is used during heating of the sintering zone. Addition of oxygen in dosed quantities causes an increase of the flame temperature, known per se, and a reduction of the amount of fuel gas.

It is further advantageous if the shaped bodies to be sintered, namely briquettes or pellets, are formed according to the measures adopted in U.S. Pat. No. 4,394,454, granted July 19, 1983, and assigned to the assignee of the present invention. This relates particularly to shaped bodies, which consist of ground, and very pure raw dolomite, and have only a low content of foreign oxides. The raw dolomite can also be admixed with caustically burned dolomite, dolomite hydrate or half-burned dolomite in quantities of 3–20% by weight; additionally foreign oxides like iron oxides, aluminum oxides or quartz can be admixed in such quantities, that the total content of the mixture of foreign oxides, calculated free from any burning loss, amounts to 1–3% by weight. The mixture to be deformed should consist, if possible, of grain sizes less than 1 mm, preferably less than 0.1 mm, and compression should be accomplished at pressures of more than 2 t/cm$^2$, if briquetting is used.

The particular advantages of the inventive method are obtained from the following heat balance:

| | | |
|---|---|---|
| Drying and dehydration | 100 kJ/kg sinter | 2% |
| Deacidifying (Decarbonization) | 3000 kJ/kg sinter | 60% |
| Wall losses | 100 kJ/kg sinter | 2% |
| Waste gas losses (2.5 m$^3$/kg sinter, 650° K.) | 1300 kJ/kg sinter | 26% |
| Sinter waste heat (530° K.) | 500 kJ/kg sinter | 10% |

| -continued | | |
|---|---|---|
| TOTAL | 5000 kJ/kg sinter | 100% |

The quantity of heat resulting from the heat balance of 5000 kJ can be accomplished up to 60%, for example, by using low grade coal, and up to 40% by the use of high grade coal. The specific fuel utilization per kg of sintered dolomite consequently lies in the inventive method considerably below the usual values (about 70%). The savings due to the advantageous heat balance as a result of the use of cheap fuels is therefore quite simple.

The inventive shaft kiln for carrying out the method for manufacturing sintered dolomite has substantially a chute-like construction with an upper preheating and deacidifying zone, and lateral heat channels associated therewith, as well as including fuel chambers connected to the heating channels, a sintering zone disposed therebelow with peripherally disposed burners, and a lower cooling zone with lateral discharge channels for the warm cooling air. Advantageously, the shaft kiln according to the invention, includes a pressure-actuated sinter discharge, and an underpressured throat of the furnace including feeding means. The shaft kiln further preferably includes a heat discharge for the warmed cooling air, means for dosed supply of this cooling air as primary air to the sintering zone and the deacidifying zone, with a heated dust-removing device precoupled thereto.

Further advantageous variants of the process and preferred implementation examples of the shaft kiln will follow from the following description of the process and the description of the figures.

The addition of the fuel energy for the deacidifying zone, and therefore also for the prewarming of the fuels can be accomplished in various means. The burning of the fuel can be accomplished, for example in outer fuel chambers, which also permit a discharge of the slag to the exterior, and which only discharge the hot discharge gases in the chute of the oven. But the fuel can also be admixed to the raw dolomite, taking into account its ash content in finely ground form, and be added together therewith to the shaped bodies. During the calcination, and subsequent additional heating, the fuel forced thereinto is burned, and the ash content improves the sinterability. Furthermore, it is also possible to heat the deacidifying zone with dust burners, or to charge lumpy fuel together with the shaped bodies, where again the ash content must be taken into account. But it has been shown to be most favorable to operate exterior fuel chambers.

The sintering zone is heated with high grade fuels, if necessary, by the addition of oxygen. Fluid and gaseous fuels for heating of the sintering zone have been shown to be most suitable, as their dosage can be more easily controlled. The number of the burners and their arrangement is to be so arranged, so that the entire cross-section of the oven is subjected to a uniform temperature.

Of importance is utilization of the heat energy, as far as possible, from the warmed cooling air. This cooling air is forced into the chute by the use of overpressure from the sintered good discharge of the oven; it cools the sinter in a counter stream, the hot cooling air is drawn off by a hot air blower below the sintering zone through discharge channels by means of a heat cyclone for coarse purification of dust. It is then fed by the hot air blower up to at most 40% (about ⅓) as primary air to the burning aggregates of the sintering zone, and supplied to up to at least 60% (about ⅔) for the burning of the fuels to the deacidifying zone. The blast furnace gas is drawn off at the head of the oven above the prewarming zone.

The distribution of the drawn off hot cooling air, according to the invention up to at least 60% to the deacidifying zone, and up to at most 40% to the sintering zone, is dependent on the choice of the fuels utilized in both zones, or on the type of the heating, particularly of the deacidifying zone, with fuels. It is further dependent on the composition of the delivered shaped bodies, and is finally dependent on the required sintering temperature in the sintering zone. An indication for the distribution of the hot cooling air is given by the measure ⅓ to ⅔.

The control of the gas streams in the chute of the oven is accomplished largely by the inner pressure of the oven. To avoid that the hot burning gases from the sintering zone are passed to the drawn off and heated cooling air, the oxygen content of the cooling air is advantageously constantly supervised. If a lowered oxygen content is measured, then the suction output of the hot air blower, whose rate of revolutions may be controlled, is reduced through a control path, so that the inner pressure of the oven in the region of the cooling air discharge is increased to such an extent that flue gas from the burners of the sintering zone can no longer follow.

Advantageously the method for the manufacture of the sintering dolomite is controlled in such a measure, that the pressure differential between the inner pressure of the oven between a plane of the sintering burning zone and a plane of the air discharge channels is approximately zero.

In addition to the oxygen analysis the temperature of the discharged cooling air can be used as a regulating quantity.

Other objects and features of the present invention will become apparent from the following detailed description considered in connection with the accompanying drawing, which discloses several embodiments of the invention. It is to be understood that the drawing is to be used for the purposes of illustration only, and not as a definition of the limits of the invention.

DESCRIPTION OF THE PREFERRED EMBODIMENTS

Figure 1:
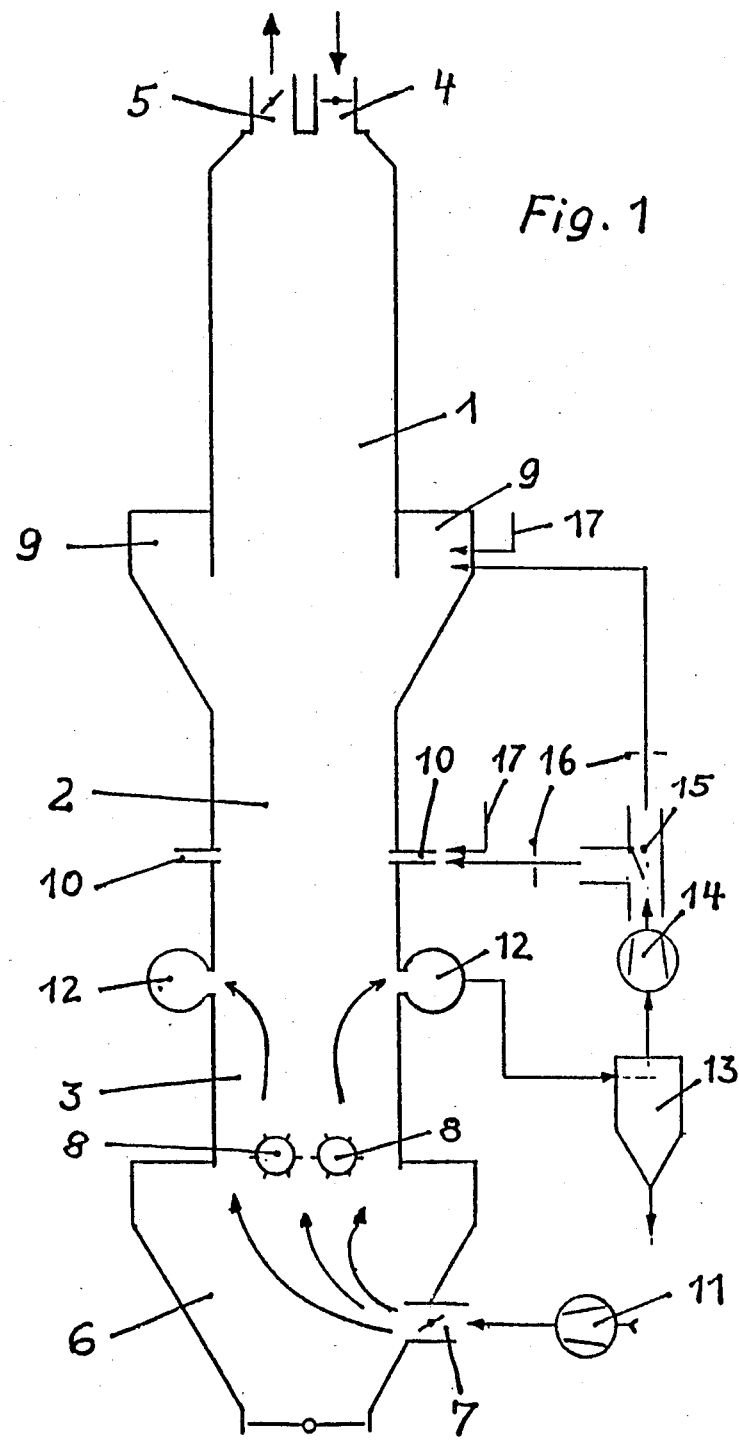
FIG. 1 is a schematic diagram of the sole Fig. of the drawing, explaining the operation of the shaft kiln according to the invention.

The oven substantially constructed in the form of a chute, which has a circular or rectangular cross-section, includes in its upper portion 1 a preheating and calcining zone, in its center portion 2 a sintering zone, and its lower portion 3 a cooling zone. Above the preheating zone there are disposed closeable or controllable devices 4 for loading, and a device 5 for discharge of the waste gases. The outlet 6 is also arranged to be closeable, and is provided with an inlet 7 for the cooling air. Within the region of the discharge below the cooling zone 3 there are disposed roller crushers 8, by means of which the discharge of the sintering goods and their delivery into the discharge region is facilitated. The heating of the deacidifying zone is accomplished through lateral heat channels 9 by (non-illustrated) burners or burning chambers disposed therein, and if necessary also by the supply of hot cooling air in conjunction with fuels, which were supplied together with the shaped bodies. Within the region of the sintering zone 2, there are disposed peripheral burners 10 in an adequate quantity and distribution. The required amount of the cooling air is forced through the ventilator 11 and through the outlet 6 into the cooling zone 3; it is drawn off the end of the cooling zone by outlets and lateral discharge channels 12 by a heat gas discharge device 14, through an interposed dust-removing device 13, and is fed through the heat discharge device 14 to the burners 10, as well as to the deacidifying zone 1. The distribution of the hot cooling air is accomplished through a tubular system 15 with control devices for distribution of the amounts. The conduit system 15 contains measuring locations 16 for determination of the $O_2$ content of the gases, their throughput amounts, temperatures etc. The measurement results are used for control or regulation of the operation of the oven. The arrows 17 denote the supply of the fuel.

It is of course possible, instead of utilizing the control arrangement for the distribution of the hot cooling air in the conduit system 15, to employ two hot discharge section devices 14 in a controllable implementation, wherein each of the two devices has associated therewith a heating region, a sintering zone 2, or a deacidifying zone 1. The measuring locations 16 are advantageously precoupled to the two hot gas ventilators.

While only several embodiments of the present invention have been shown and described, it is obvious that many changes and modifications may be made thereunto without departing from the spirit and scope of the invention.

What is claimed is:

1. In a method of manufacturing sintered dolomite having raw densities exceeding about 3.0 grams per cubic centimeter and total foreign oxide content of 1 to 3% by weight based on an initial ignition loss free mixture in a shaft kiln from ground raw dolomite briquetted or pelletized into shaped bodies, the steps comprising
   deacidifying and heating said shaped bodies to a temperature of at least 1000° C. in an upper region of said shaft kiln in a preheating and deacidifying zone heated with fuels of a low thermal content,
   thereafter sintering said shaped bodies in a lower sintering zone heated with fuels of high thermal content, so as to heat said shaped bodies to a temperature of about 1600° C. to about 2000° C.,
   subsequently passing the sintered bodies into a lower cooling zone, and cooling said bodies therein, and, thereafter,
   discharging said sintered bodies from said shaft kiln.

2. The method as claimed in claim 1, wherein the cooling of said bodies is performed with the aid of cooling air, and further comprising the steps of heating said cooling air by absorbing heat from the heated bodies, of utilizing at least 60% of the heated cooling air as primary air for combustion of said fuels of low thermal content, and of utilizing at most 40% of the heated cooling air as primary air for combustion of said fuels of high thermal content.

3. The method as claimed in claim 1, further comprising the steps of
   utilizing as fuels of said low thermal content fuels from the group consisting of ash-rich stone coal, water-containing brown coal, waste gas, waste oil and cinder, and of
   utilizing as fuels of said high thermal content fuels from the group consisting of stone coal having less than 10% of ashes, less than 1% of water, and less than 10% of volatile substances, heavy heating oil having less than 2% of sulphur, light heating oil having less than 1% of sulphur, natural gas, and refinery gas.

4. The method as claimed in claim 2, wherein the heating of said sintering zone includes the step of adding oxygen to the heated cooling air.

5. The method as claimed in claim 1, further comprising the use of bodies made of milled raw dolomite of the type which include the steps of adding foreign oxides to milled pure raw dolomite powder having a low content of foreign oxides in such quantities that the total content of foreign oxides is 1 to 3% by weight based on an initial ignition loss free mixture, pressing the milled raw dolomite powder-foreign oxide admixture into briquets, heating the briquets to a sintering temperature, and adding a member selected from the group consisting of burnt dolomite, dolomite hydrate, semi-burnt dolomite and combinations thereof in quantities of between 3 and 20% by weight, relative to the total mixture, to said raw dolomite powder, so that the resultant dolomite sinter has a low porosity and a good hydration stability.

6. The method as claimed in claim 1, wherein an inner pressure is operatively prevailing in said shaft kiln, and wherein said sintering zone and said cooling zone are disposed in different respective kiln regions, and further comprising the step of arranging the pressure difference between said regions to be approximately equal to zero.

* * * * *